(12) United States Patent
Woolf (10) Patent No.: US 9,283,821 B2
(45) Date of Patent: Mar. 15, 2016

(54) HITCH COUPLER RECEIVING APPARATUS

(71) Applicant: Teleswivel, LLC, Durham, NC (US)

(72) Inventor: William David Woolf, Durham, NC (US)

(73) Assignee: TeleSwivel, LLC, Durham, NC (US)

( * ) Notice: Subject to any disclaimer, the term of this patent is extended or adjusted under 35 U.S.C. 154(b) by 0 days.

(21) Appl. No.: 14/317,890

(22) Filed: Jun. 27, 2014

(65) Prior Publication Data

US 2015/0008657 A1 Jan. 8, 2015

Related U.S. Application Data

(60) Provisional application No. 61/842,159, filed on Jul. 2, 2013.

(51) Int. Cl.
| | |
|---|---|
| *B60D 1/46* | (2006.01) |
| *B60D 1/06* | (2006.01) |
| *B60D 1/07* | (2006.01) |
| *B60D 1/48* | (2006.01) |

(52) U.S. Cl.
CPC .. *B60D 1/06* (2013.01); *B60D 1/07* (2013.01); *B60D 1/46* (2013.01); *B60D 1/485* (2013.01)

(58) Field of Classification Search
CPC .............. B60D 1/06; B60D 1/07; B60D 1/40; B60D 1/46; B60D 1/485
See application file for complete search history.

(56) References Cited

U.S. PATENT DOCUMENTS

| | | | | |
|---|---|---|---|---|
| 1,032,075 A * | 7/1912 | Meyer | ...................... | B60D 1/40 278/49 |
| 1,068,334 A * | 7/1913 | Goodhue | ................. | B60D 1/40 280/478.1 |
| 1,083,779 A * | 1/1914 | Tucker | ..................... | B60D 1/40 278/49 |
| 3,664,686 A * | 5/1972 | Anderson | ................ | B60D 1/46 280/490.1 |
| 3,692,330 A * | 9/1972 | Kendall | .................... | B60D 1/46 280/402 |
| 3,801,134 A * | 4/1974 | Dees | ........................ | B60D 1/07 280/416.1 |
| 4,050,714 A * | 9/1977 | Epp | .......................... | B60D 1/06 280/495 |
| 5,135,247 A * | 8/1992 | Alfaro | ...................... | B60D 1/07 280/415.1 |
| 5,765,850 A * | 6/1998 | Emerson | .................. | B60D 1/46 280/490.1 |
| 5,947,504 A * | 9/1999 | Milazzo | ................... | B60D 1/06 280/457 |
| 6,575,488 B2 * | 6/2003 | Massey | ..................... | B60D 1/46 280/490.1 |
| 6,908,094 B1 * | 6/2005 | Sellers | ...................... | B60D 1/46 280/490.1 |
| 2001/0038191 A1 * | 11/2001 | Massey | ..................... | B60D 1/46 280/490.1 |
| 2003/0006581 A1 * | 1/2003 | Moss | ........................ | B60D 1/06 280/416.1 |

(Continued)

*Primary Examiner* — Joseph Rocca
*Assistant Examiner* — Gabriela C Craciun
(74) *Attorney, Agent, or Firm* — Myers Bigel & Sibley (57) ABSTRACT

A hitch coupler receiving apparatus includes a base having opposite first and second surfaces, and a pair of spaced-apart first and second openings extending through the base from the first surface to the second surface. A pair of opposing, elongated first and second walls extend outwardly from the base first surface in adjacent, spaced-apart relationship. Each wall includes a plurality of spaced apertures formed therethrough. A hitch coupler is secured to the apparatus via a fastener that engages aligned apertures in the respective first and second walls. Each wall overlies a respective one of the first and second openings and includes an access opening. Each access opening is substantially larger than a respective opening in the base and facilitates insertion of a fastener into a respective opening in the base and rotation of the fastener via a tool.

16 Claims, 12 Drawing Sheets

(56) References Cited

U.S. PATENT DOCUMENTS

| | | | |
|---|---|---|---|
| 2003/0222427 A1* | 12/2003 | Wolters | B60D 1/02 280/495 |
| 2004/0032112 A1* | 2/2004 | Reese | B60D 1/06 280/477 |
| 2006/0006626 A1* | 1/2006 | Scruggs | B60D 1/06 280/495 |
| 2008/0164678 A1* | 7/2008 | White | B60D 1/143 280/504 |
| 2009/0072517 A1* | 3/2009 | Monostori | B60D 1/488 280/490.1 |
| 2012/0112433 A1* | 5/2012 | Williams, Jr. | B60D 1/04 280/490.1 |
| 2015/0158356 A1* | 6/2015 | Woolf | B60D 1/46 280/504 |

* cited by examiner

HITCH COUPLER RECEIVING APPARATUS

RELATED APPLICATION

This application claims the benefit of and priority to U.S. Provisional Patent Application No. 61/842,159 filed Jul. 2, 2013, the disclosure of which is incorporated herein by reference as if set forth in its entirety.

FIELD OF THE INVENTION

The present invention relates generally to vehicle towing and, more particularly, to towing apparatus.

BACKGROUND

Powered and trailed vehicles are conventionally interconnected for travel by coupling hitches involving fixed locations on the vehicles. Using ball and socket-type universal connections or pin-type connections, the required relative movement during travel is provided. The fixed locations, however, may be difficult to effect, particularly with large vehicles that prevent ready manual alignment for final coupling. In many instances, the receiving hitch of a towing vehicle may be misaligned both horizontally and vertically relative to the tongue of a towed vehicle. When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a hitch coupler receiving apparatus includes a base having opposite first and second surfaces, and a pair of spaced-apart first and second openings extending through the base from the first surface to the second surface. A pair of opposing, elongated first and second walls extend outwardly from the base first surface in adjacent, spaced-apart relationship. In some embodiments, the first and second walls extend outwardly from the base first surface in a direction that is substantially orthogonal to the base first surface. However, in other embodiments, the first and second walls may extend outwardly from the base first surface in a slightly diverging orientation.

Each wall overlies at least a portion of a respective one of the first and second openings. Each wall includes an access opening that is in adjacent, overlying relationship with each respective opening in the base. Each access opening is substantially larger than a respective opening in the base and facilitates insertion of a fastener into a respective opening in the base and rotation of the fastener via a tool. Each wall includes a plurality of spaced apertures formed therethrough. A hitch coupler is secured to the apparatus via a fastener that engages aligned apertures in the respective first and second walls.

In some embodiments, the base has a length and the first and second walls each have a respective length that is substantially the same as the length of the base. In other embodiments, the base has a length and the first and second walls each have a respective length that is substantially greater than the length of the base.

In some embodiments, the base includes a first pair of spaced-apart openings extending through the base from the first surface to the second surface, and a second pair of spaced-apart openings extending through the base from the first surface to the second surface. The first wall overlies at least a portion of each of the first pair of spaced-apart openings and the second wall overlies at least a portion of each of the second pair of spaced-apart openings. The first wall also includes a pair of spaced apart access openings in adjacent, overlying relationship with the first pair of openings in the base, and the second wall also includes a pair of spaced apart access openings in adjacent, overlying relationship with the second pair of openings in the base. Each access opening is substantially larger than a respective opening in the base.

According other embodiments of the present invention, a hitch coupler receiving apparatus includes a base having opposite first and second surfaces, and a pair of spaced-apart first and second openings extending through the base from the first surface to the second surface. A U-shaped channel member having an elongated base wall and a pair of elongated first and second walls extends outwardly from the base wall. The first and second walls each include a plurality of spaced apertures formed therethrough, and a hitch coupler is secured to the apparatus via a fastener that engages aligned apertures in the respective first and second walls.

The base wall is secured to the base first surface in face-to-face contacting relationship such that the first wall overlies at least a portion of the first opening and the second wall overlies at least a portion of the second opening. Each of the first and second walls includes an access opening in adjacent, overlying relationship with each respective opening in the base. Each access opening is substantially larger than a respective opening in the base and facilitates insertion of a fastener into a respective opening in the base and rotation of the fastener via a tool.

In some embodiments, the channel member has an arcuate transition portion between the base wall and the first wall and an arcuate transition portion between the base wall and the second wall. Each arcuate transition portion includes at least a portion of a respective one of the access openings.

In some embodiments, the base has a length and the channel member has a length that is substantially the same as the length of the base. In other embodiments, the base has a length and the channel member has a length that is substantially greater than the length of the base.

In some embodiments, the base includes a first pair of spaced-apart openings extending through the base from the first surface to the second surface, and a second pair of spaced-apart openings extending through the base from the first surface to the second surface. The first wall overlies at least a portion of each of the first pair of spaced-apart openings and the second wall overlies at least a portion of each of the second pair of spaced-apart openings. The first wall also includes a pair of spaced apart access openings in adjacent, overlying relationship with the first pair of openings in the base, and the second wall also includes a pair of spaced apart access openings in adjacent, overlying relationship with the second pair of openings in the base. Each access opening is substantially larger than a respective opening in the base.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/−20%, 10%, 5%, 1%, 0.5%, or even 0.1%.

The term "vehicle" includes all types of vehicles including, but not limited to, automobiles, trucks, military vehicles, airplanes, trains, etc., and also includes towed vehicles and towing vehicles.

Figure 1A:
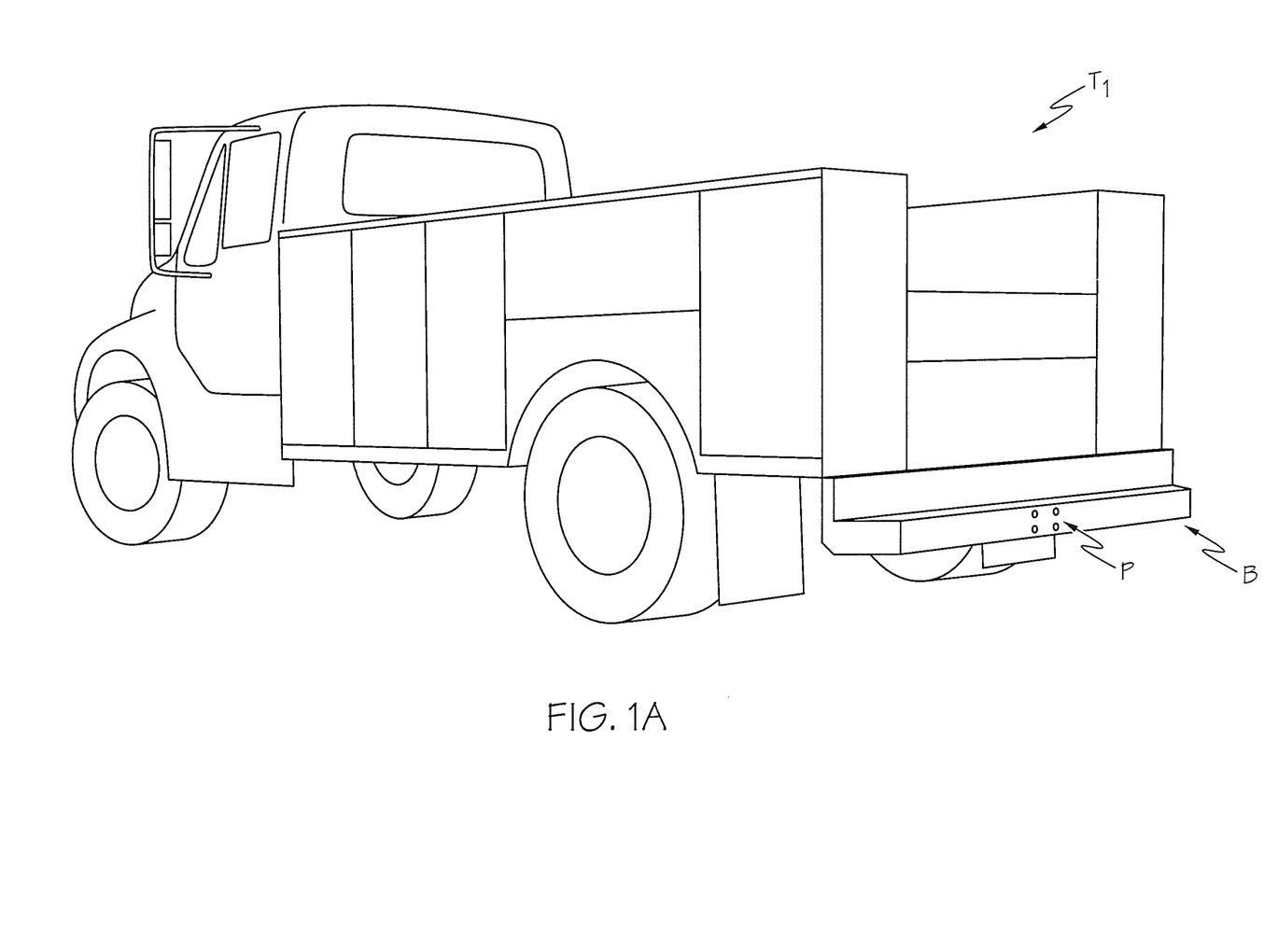
FIG. 1A illustrates an exemplary vehicle onto which a hitch coupler receiving apparatus, according to embodiments of the present invention, can be mounted.
Figure 1B:
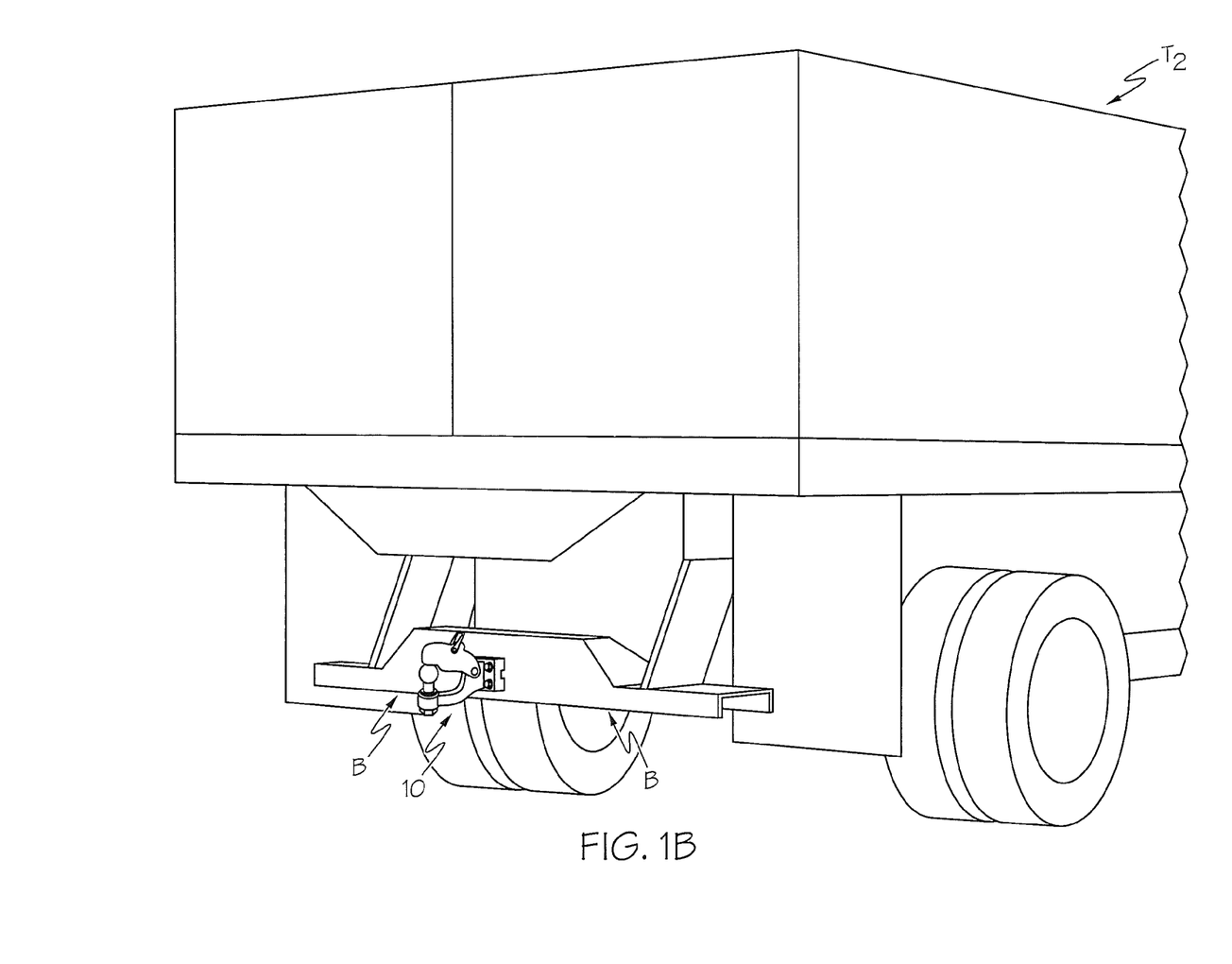
FIG. 1B illustrates an exemplary vehicle onto which a hitch coupler is directly mounted.

FIGS. 1A and 1B illustrate exemplary vehicles onto which a hitch coupler receiving apparatus (e.g., 20, FIGS. 2A-2D; 3A-3B; 5A-5D; 6; 7; 9; and 10A-10B), according to embodiments of the present invention, can be mounted. For example, FIG. 1A illustrates a rear bumper B of a truck $T_1$ that includes a portion having openings or passages P formed therethrough. A hitch coupler device can be mounted on the bumper B via fasteners (e.g., bolts, threaded rods, etc.) extending through the passages P. In some embodiments, the passages may be threaded so as to threadingly engage a threaded fastener, such as a bolt. Conventionally, the threaded passages P are arranged in a rectangular, four-bolt pattern, as illustrated.

Figure 1C:
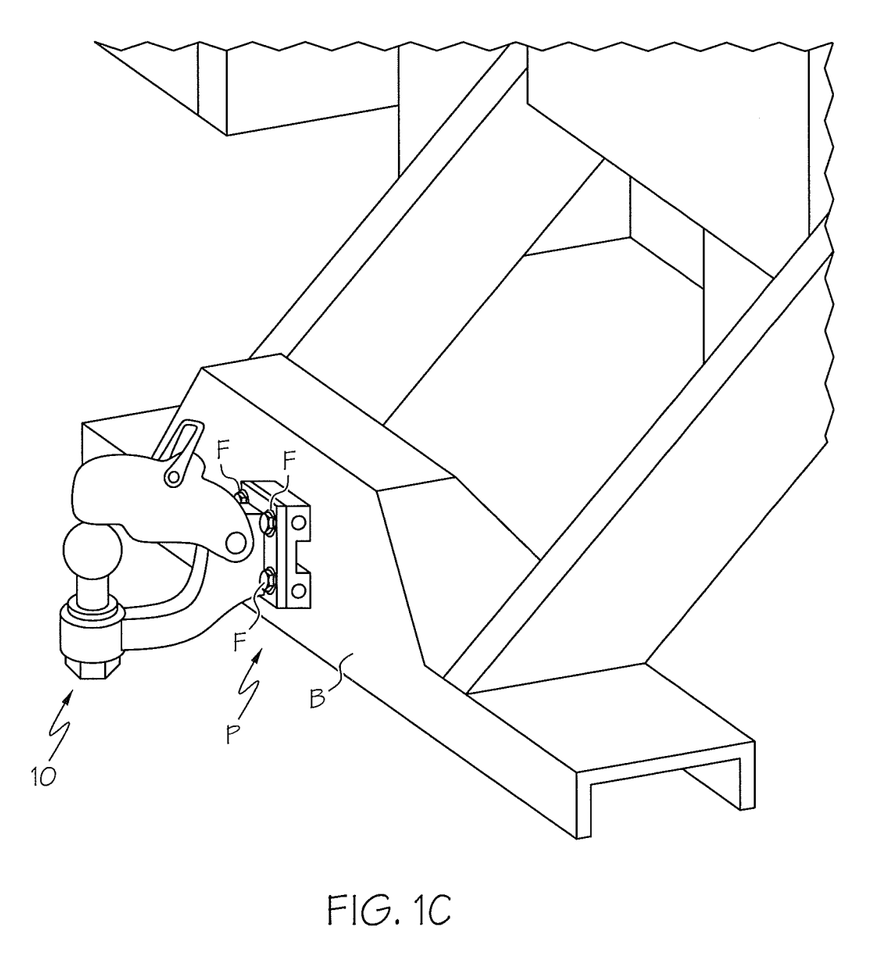
FIG. 1C illustrates a portion of the rear bumper of the vehicle of FIG. 1B with the hitch coupler mounted directly thereto.
Figure 2A:
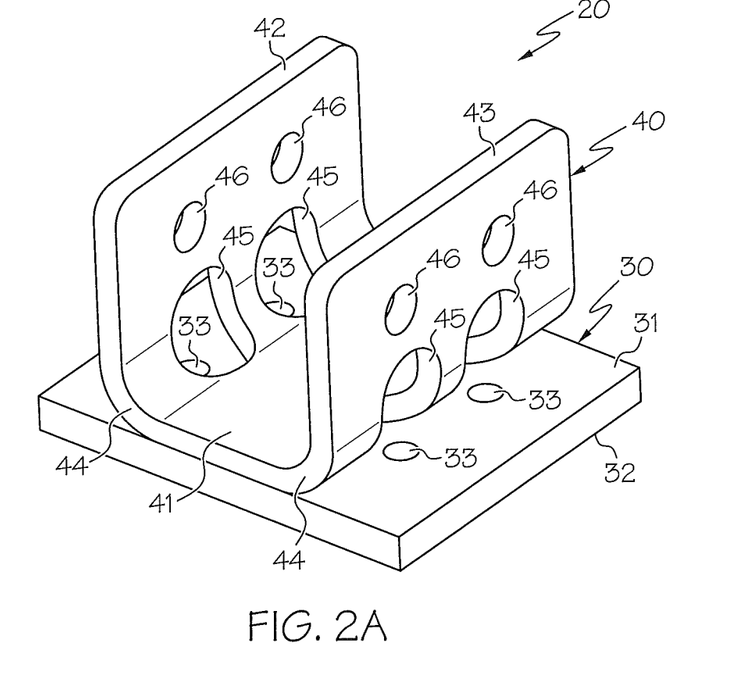
FIG. 2A is a front perspective view of a hitch coupler receiving apparatus, according to some embodiments of the present invention.
Figure 2B:
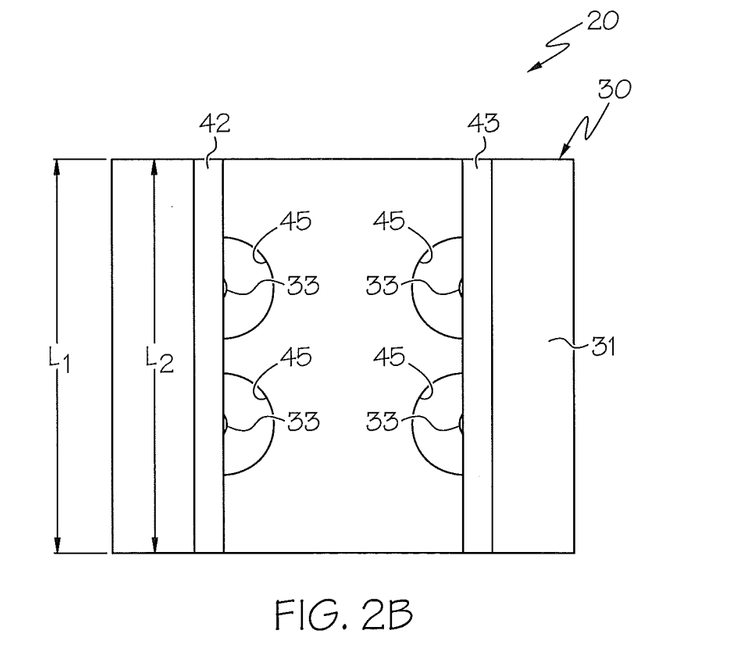
FIG. 2B is a front plan view of the hitch coupler receiving apparatus of FIG. 2A.
Figure 2C:
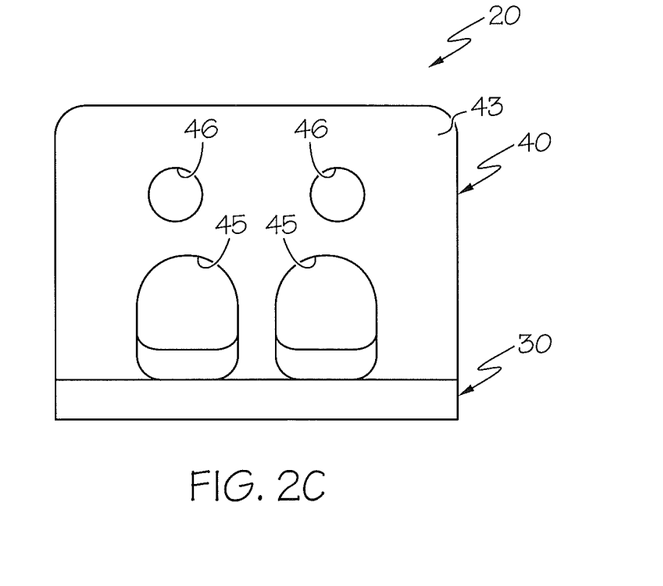
FIG. 2C is a side view of the hitch coupler receiving apparatus of FIG. 2A.
Figure 2D:
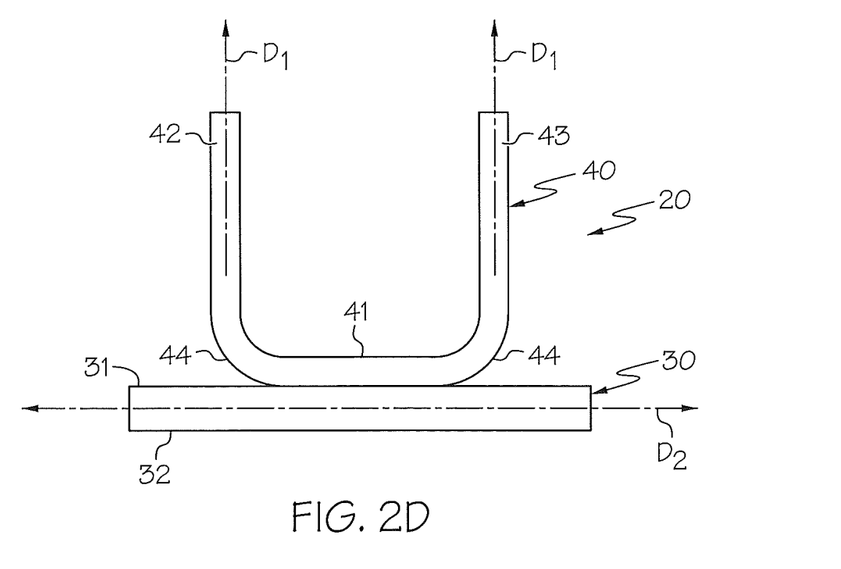
FIG. 2D is an end view of the hitch coupler receiving apparatus of FIG. 2A.
Figure 3A:
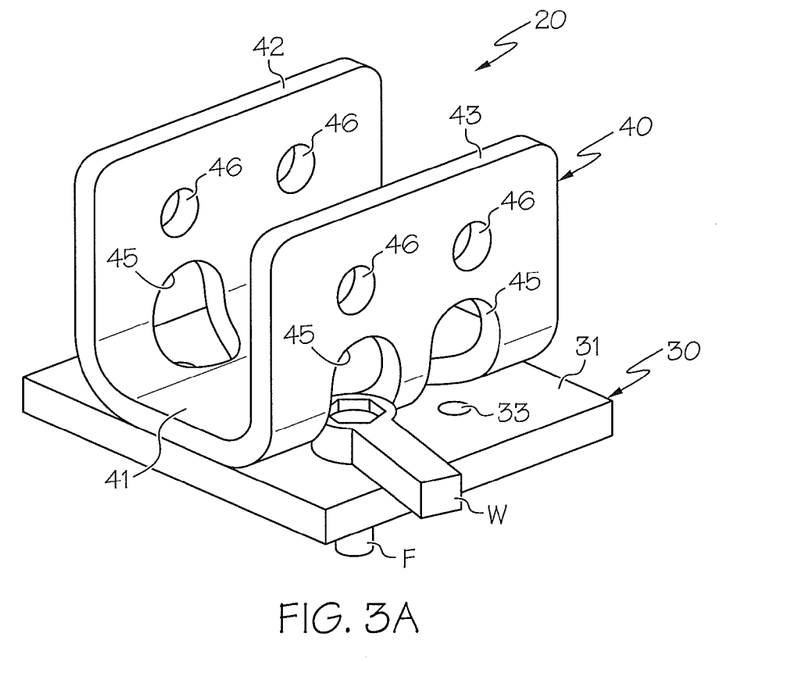
FIGS. 3A-3B illustrate how an access opening in the side walls of the hitch coupler receiving apparatus of FIG. 2A facilitates insertion of a threaded fastener through a respective opening in the base of the hitch coupler receiving apparatus, and facilitates rotation of the fastener by a tool.
Figure 3B:
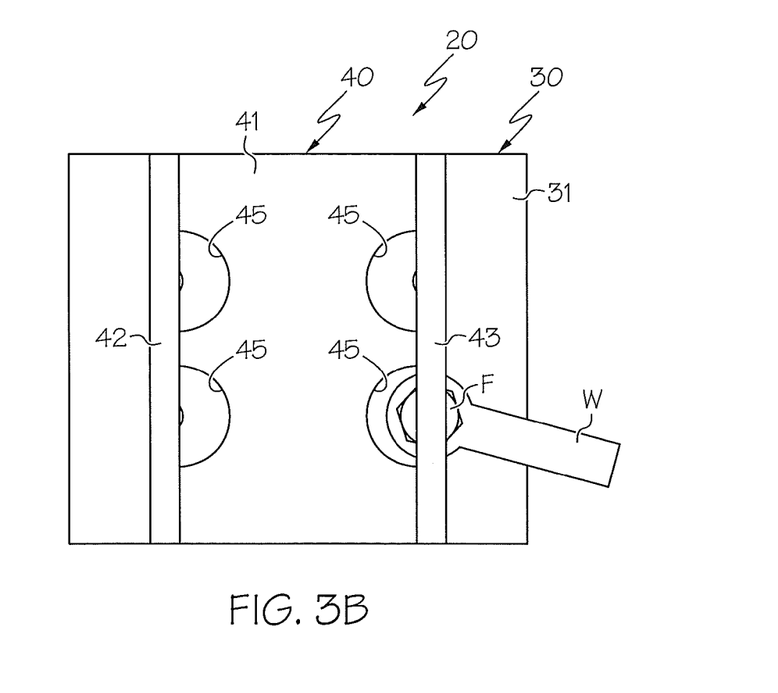

FIGS. 1B and 1C illustrate a rear bumper B of a truck $T_2$ that has a hitch coupler device 10 attached thereto via fasteners F that engage the bumper B via the passageways P extending therethrough. FIG. 1C is an enlarged view of the portion of the rear bumper B of the vehicle $T_2$ of FIG. 1B with a hitch coupler device 10 attached thereto via fasteners F.

FIGS. 2A-2D illustrate a hitch coupler receiving apparatus 20, according to some embodiments of the present invention. The apparatus 20 includes a base 30 and a U-shaped channel member 40 secured to the base 30. The channel member 40 may be secured to the base 30, for example, via welding, fasteners, or a combination of welding and fasteners, as would be understood by those skilled in the art. In the illustrated embodiment, the base 30 is a generally rectangular plate, such as a plate of steel or other similar material. However, the base 30 may have various shapes and configurations and need not be a plate or plate-shaped. The illustrated base 30 includes opposite first and second surfaces 31, 32, and a plurality of openings 33 extending through the base 30 from the first surface 31 to the second surface 32. The openings 33 are arranged in a rectangular four-bolt pattern that match a corresponding four-hole pattern in a bumper or other structural element of a vehicle (e.g., P in truck $T_1$, FIG. 1A).

Figure 4A:
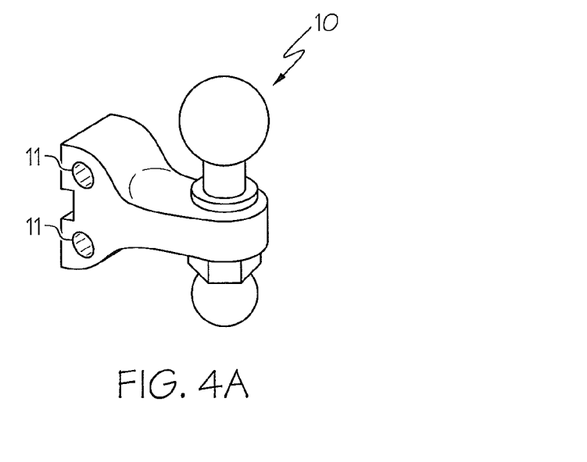
FIGS. 4A-4C illustrate exemplary hitch coupler devices that can be secured to a hitch coupler receiving apparatus, according to embodiments of the present invention.
Figure 4B:
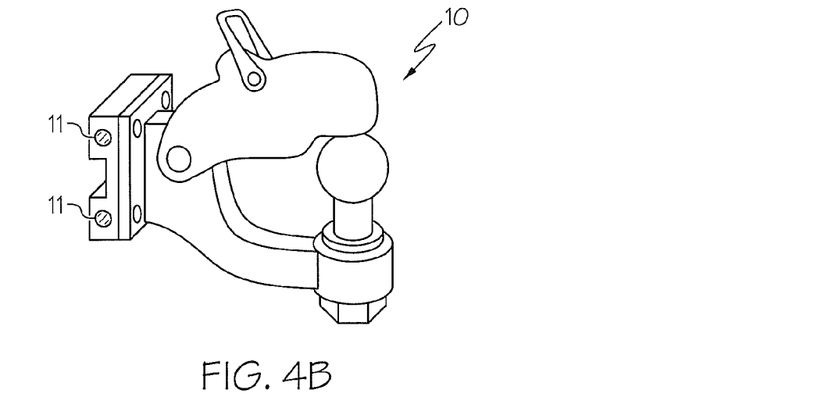
Figure 4C:
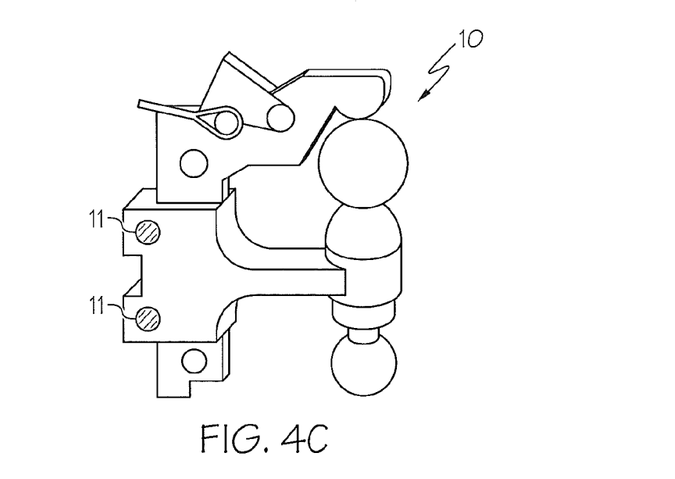
Figure 5A:
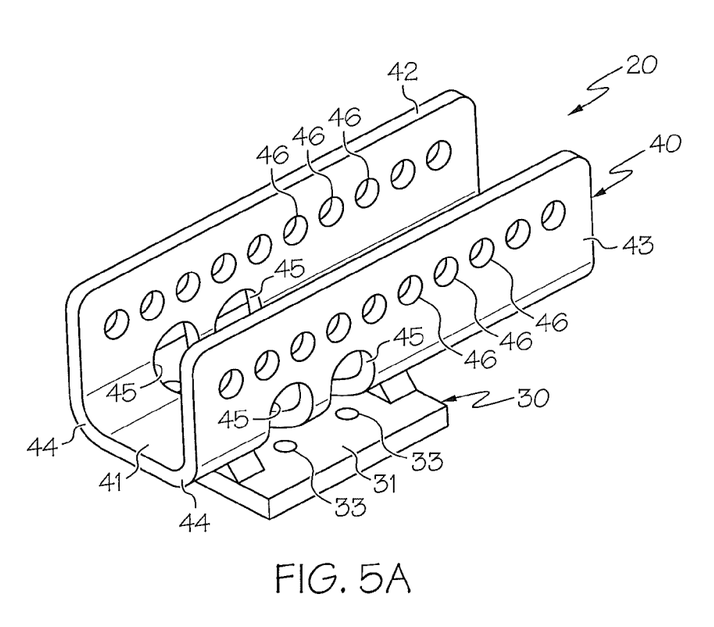
FIG. 5A is a front perspective view of a hitch coupler receiving apparatus, according to other embodiments of the present invention.
Figure 5B:
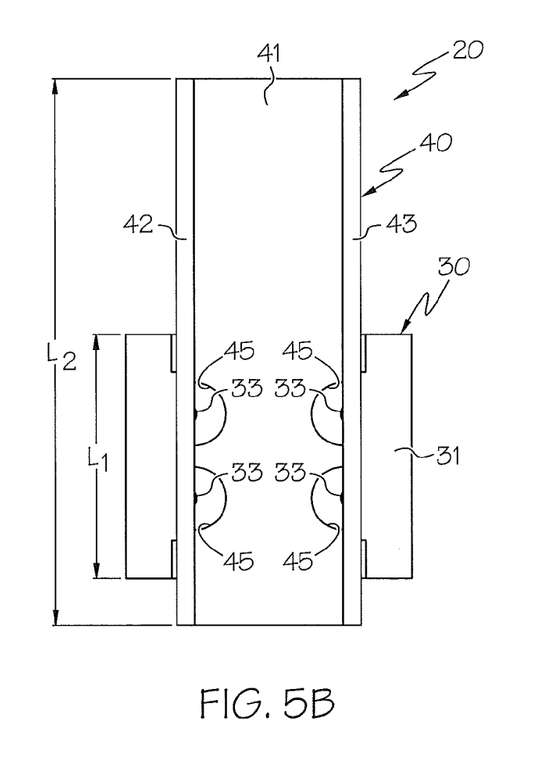
FIG. 5B is a front plan view of the hitch coupler receiving apparatus of FIG. 5A.
Figure 5C:
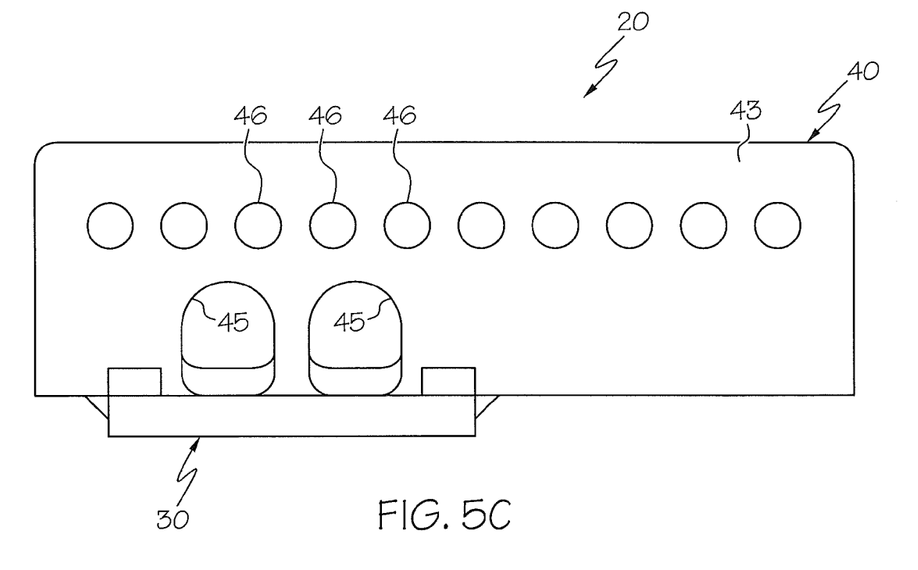
FIG. 5C is a side view of the hitch coupler receiving apparatus of FIG. 5A.
Figure 5D:
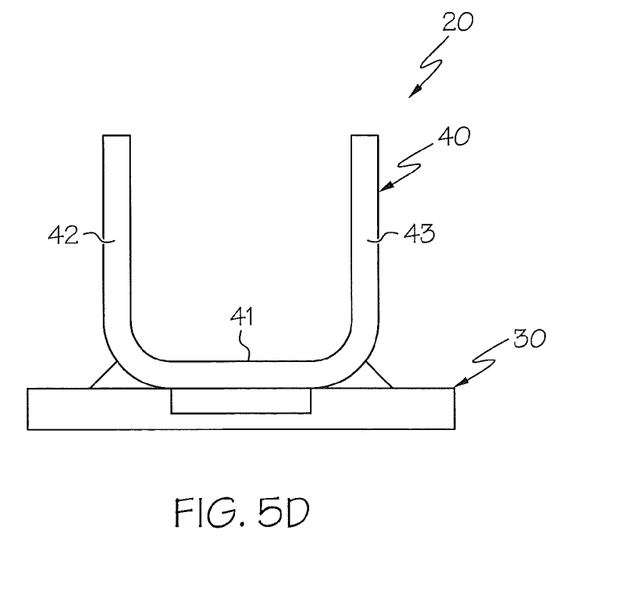
FIG. 5D is an end view of the hitch coupler receiving apparatus of FIG. 5A.

The illustrated channel member 40 includes an elongated base wall 41 and a pair of elongated first and second walls 42, 43 extending outwardly from the base wall 41. In the illustrated embodiment, the first and second walls 42, 43 extend outwardly from the base first surface 31 in a direction $D_1$ (FIG. 2D) that is substantially orthogonal to the base first surface 31 (e.g., $D_1$ is substantially orthogonal to $D_2$). The first and second walls 42, 43 each include a plurality of spaced apertures 46 formed therethrough. A hitch coupler device (e.g., 10, FIGS. 4A-4C) is secured to the apparatus 20 via one or more fasteners (e.g., pins, rods, bolts, etc.) that engage aligned apertures 46 in the respective first and second walls 42, 43 and corresponding apertures 11 in a hitch coupler device 10, as would be understood by one skilled in the art. Various types of hitch couplers can be secured to the apparatus 20 including, but not limited to, ball couplers, pintle hooks, swivel pintle hooks, lunette rings, clevis pin attachments, etc.

The base wall 41 is secured to the base first surface 31 in face-to-face contacting relationship such that the first wall 42 overlies at least a portion of a pair of openings 33 and such that the second wall 43 overlies at least a portion of the other pair of openings 33. In the illustrated embodiment, the channel member 40 includes an arcuate transition portion 44 between the base wall 41 and the first wall 42 and an arcuate transition portion 44 between the base wall 41 and the second wall 43.

Each of the first and second walls 42, 43 includes a pair of access openings 45, as illustrated. Each access opening 45 is in adjacent, overlying relationship with a respective opening 33 in the base 30. Each access opening 45 facilitates insertion of a fastener (F, FIGS. 3A, 3B, 10A, 10B) into a respective opening 33 in the base 30 and rotation of the fastener F via a tool (W, FIGS. 3A, 3B). In the illustrated embodiment, each arcuate transition portion 44 includes at least a portion of a respective one of the access openings 45. In the illustrated embodiment, each access opening 45 is substantially larger (e.g., larger in diameter) than a respective opening 33 in the base 30. For example, each access opening 45 may have a diameter that is 1.5×, 2×, 3×, 4×, 5×, or greater than a diameter of a respective opening 33 in the base 30.

In the embodiments of the apparatus 20 illustrated in FIGS. 2A-2D, the base 30 has a length $L_1$ and the channel member has a length $L_2$ that is substantially the same as the length $L_1$ of the base 30. In the embodiments illustrated in FIGS. 5A-5D, the base 30 has a length $L_1$ and the channel member has a length $L_2$ that is substantially greater than the length $L_1$ of the base 30.

Figure 6:
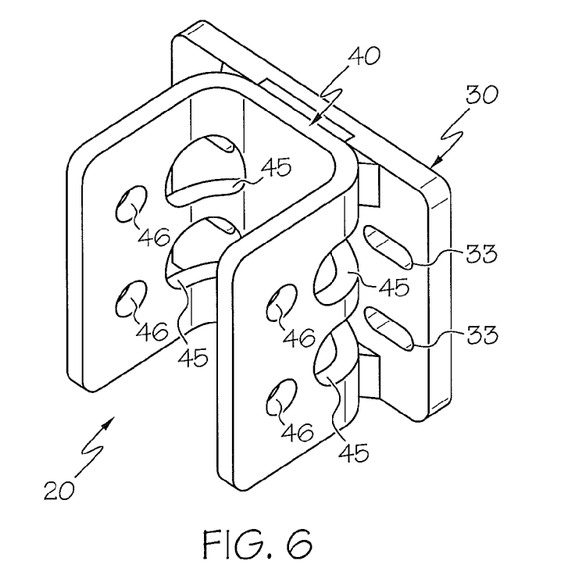
FIG. 6 is a front perspective view of a hitch coupler receiving apparatus, according to other embodiments of the present invention.
Figure 7:
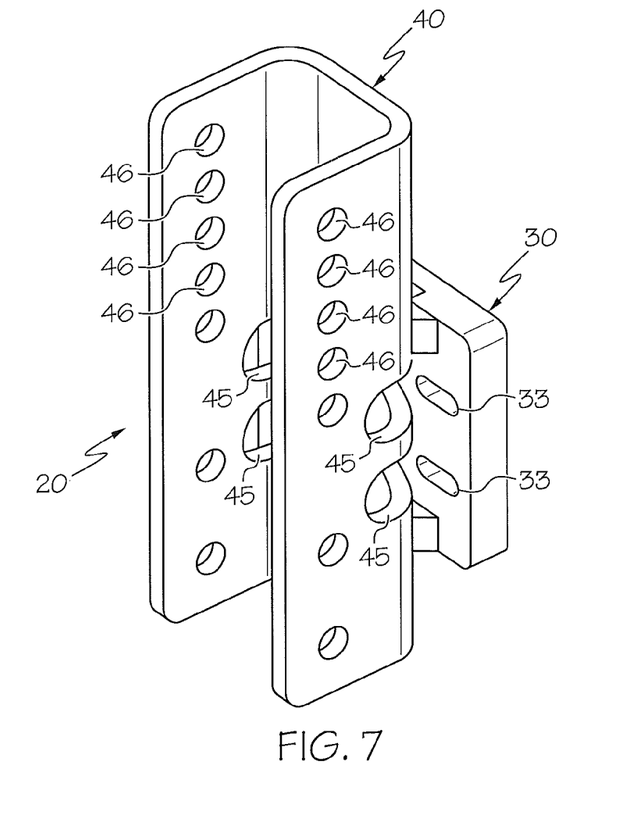
FIG. 7 is a front perspective view of a hitch coupler receiving apparatus, according to other embodiments of the present invention.

FIGS. 6 and 7 illustrate two respective hitch coupler receiving apparatus 20 wherein the openings 33 in the base 30 are elongated in configuration. This elongation of openings 33 can facilitate alignment with different four-bolt patterns and/or can facilitate installation of fasteners (e.g., bolts, threaded rods, etc.) therethrough.

Figure 8:
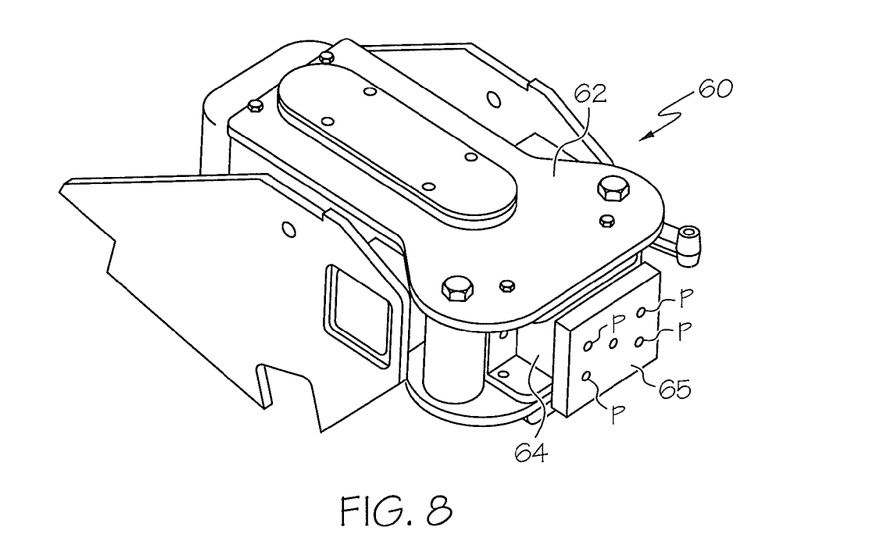
FIG. 8 is a perspective view of a hitch apparatus that includes a housing configured to be attached to a vehicle, and a tow bar movably disposed within the housing and movable relative to the housing between a fully retracted position and a plurality of extended positions, and wherein the tow bar distal end is configured to receive a hitch coupler receiving apparatus according to embodiments of the present invention.
Figure 9:
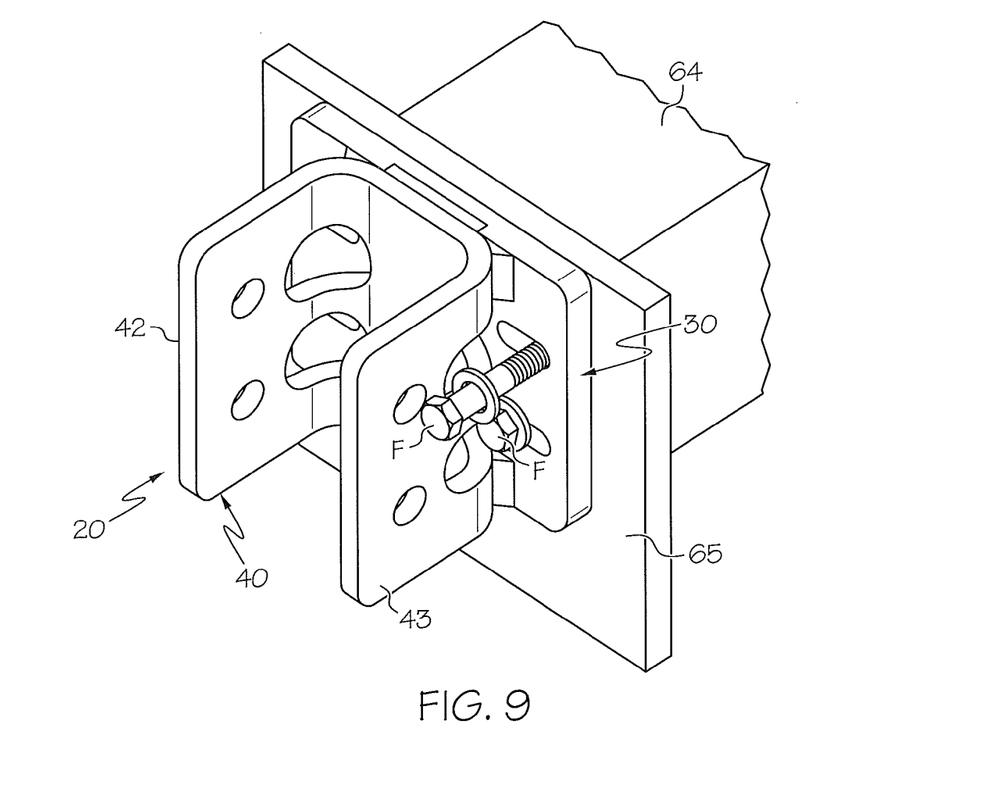
FIG. 9 illustrates a hitch coupler receiving apparatus according to embodiments of the present invention attached to the distal end of a tow bar, such as the tow bar of the hitch apparatus of FIG. 8.

FIG. 8 illustrates a hitch apparatus 60 that includes a housing 62 configured to be attached to a vehicle, and a tow bar 64 movably disposed within the housing 62. The tow bar 64 is movable relative to the housing 62 between a fully retracted position and a plurality of extended positions. Hitch apparatus 60 can have various configurations as described and illustrated in co-owned and co-pending U.S. Patent Application Publication Nos. 2011/0221166; 2012/0112433; and 2011/0221164, which are incorporated herein by reference in their entireties. The tow bar distal end 65 is configured to receive a hitch coupler receiving apparatus 20 according to embodiments of the present invention. The illustrated tow bar distal end 65 includes a four-bolt pattern of openings P. Each of the various hitch coupler receiving apparatus 20 described herein can be bolted to the tow bar distal end 65, for example, as illustrated in FIG. 9.

Figure 10A:
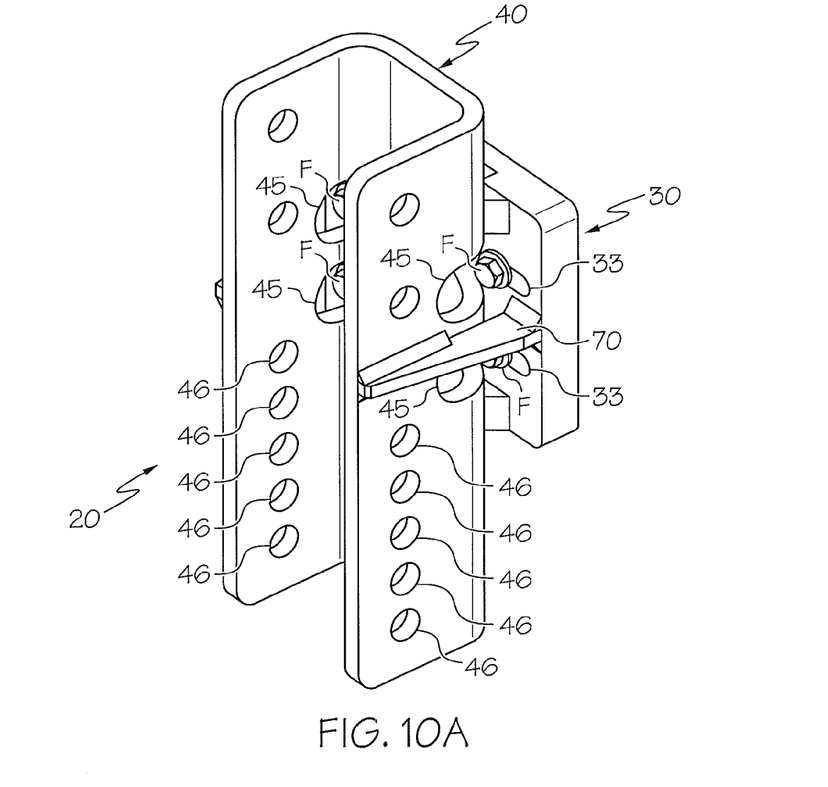
FIG. 10A is a front perspective view of a hitch coupler receiving apparatus, according to other embodiments of the present invention.
Figure 10B:
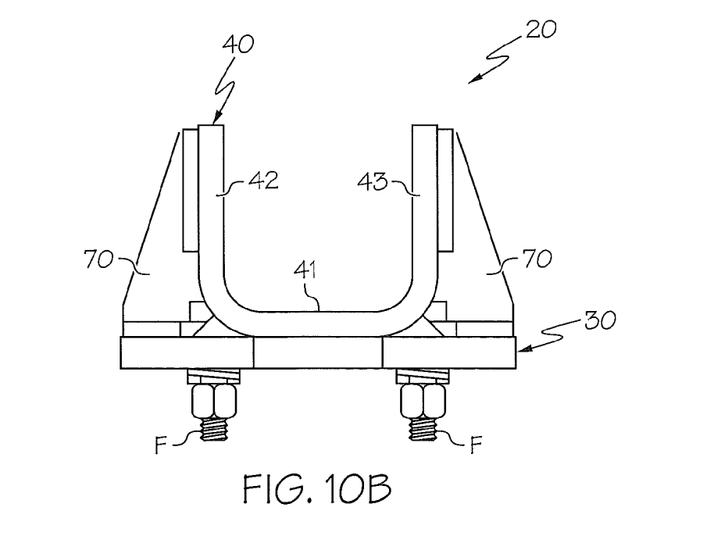
FIG. 10B is an end view of the hitch coupler receiving apparatus of FIG. 10A.

FIGS. 10A-10B illustrate a hitch coupler receiving apparatus 20, according to some embodiments of the present invention. The apparatus 20 includes a base 30 and a U-shaped channel member 40 secured to the base 30. A pair of gussets 70 are used to secure the channel member 40 to the base 30. As illustrated, one gusset 70 is welded to the first wall 42 and to the base 30, and another gusset 70 is welded to the second wall 43 and to the base 30. The gussets 70 provide additional structural integrity to the hitch coupler receiving apparatus 20. Fasteners F are inserted through the respective openings 33 extending through the base 30. The fasteners F are threaded bolts and are illustrated with corresponding nuts threaded onto the bolts.

Hitch coupler receiving apparatus 20, according to the various embodiments of the present invention, may be formed from various types of material including, but not limited to, steel, carbon steel, alloy steel, tool steel, stainless steel, aluminum, any combination thereof, and/or other like materials; alloys, such as aluminum alloy, titanium alloy, magnesium alloy, any combination thereof, and/or other like materials. Hitch coupler receiving apparatus 20, according to embodiments of the present invention, are not limited to being formed from a particular type of material.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch coupler receiving apparatus, comprising:
a base comprising opposite first and second surfaces, a first pair of spaced-apart openings extending through the base from the first surface to the second surface, and a second pair of spaced-apart openings extending through the base from the first surface to the second surface; and
a pair of opposing, elongated first and second walls extending outwardly from the base first surface in adjacent, spaced-apart relationship, wherein the first wall overlies at least a portion of each of the first pair of spaced-apart openings and the second wall overlies at least a portion of each of the second pair of spaced-apart openings, wherein the first wall comprises a pair of spaced apart access openings in adjacent, overlying relationship with the first pair of openings in the base, and wherein the second wall comprises a pair of spaced apart access openings in adjacent, overlying relationship with the second pair of openings in the base, wherein each access opening facilitates insertion of a fastener into a respective opening in the base and rotation of the fastener via a tool.

2. The apparatus of claim 1, wherein the base has a length and wherein the first and second walls each have a respective length that is substantially the same as the length of the base.

3. The apparatus of claim 1, wherein the base has a length and wherein the first and second walls each have a respective length that is substantially greater than the length of the base.

4. The apparatus of claim 1, wherein each wall includes a plurality of spaced apertures formed therethrough, and wherein a hitch coupler is secured to the apparatus via another fastener that engages aligned apertures in the respective first and second walls.

5. The apparatus of claim 1, wherein each access opening is substantially larger than a respective opening in the base.

6. The apparatus of claim 1, wherein each access opening is substantially larger than a respective opening in the base.

7. The apparatus of claim 1, wherein the first and second walls extend outwardly from the base first surface in a direction that is substantially orthogonal to the base first surface.

8. A hitch coupler receiving apparatus, comprising:
a base comprising opposite first and second surfaces, and a pair of spaced-apart first and second openings extending through the base from the first surface to the second surface; and
a U-shaped channel member comprising an elongated base wall and a pair of elongated first and second walls extending outwardly from the base wall, wherein the base wall is secured to the base first surface in face-to-face contacting relationship such that the first wall overlies at least a portion of the first opening and the second wall overlies at least a portion of the second opening, and wherein each of the first and second walls comprises an access opening in adjacent, overlying relationship with each respective opening in the base, wherein the channel member comprises an arcuate transition portion between the base wall and the first wall and an arcuate transition portion between the base wall and the second wall, and wherein each arcuate transition portion includes at least a portion of a respective one of the access openings, wherein each access opening facilitates insertion of a fastener into a respective opening in the base and rotation of the fastener via a tool.

9. The apparatus of claim 8, wherein the base has a length and wherein the channel member has a length that is substantially the same as the length of the base.

10. The apparatus of claim 8, wherein the base has a length and wherein the channel member has a length that is substantially greater than the length of the base.

11. The apparatus of claim 8, wherein the first and second walls each include a plurality of spaced apertures formed therethrough, and wherein a hitch coupler is secured to the apparatus via another fastener that engages aligned apertures in the respective first and second walls.

12. The apparatus of claim 8, wherein each access opening is substantially larger than a respective opening in the base.

13. A hitch coupler receiving apparatus, comprising:
a base comprising opposite first and second surfaces, wherein the base comprises a first pair of spaced-apart openings extending through the base from the first surface to the second surface, and a second pair of spaced-apart openings extending through the base from the first surface to the second surface;

a U-shaped channel member comprising an elongated base wall and a pair of elongated first and second walls extending outwardly from the base wall, wherein the base wall is secured to the base first surface in face-to-face contacting relationship such that the first wall overlies at least a portion of each of the first pair of spaced-apart openings and the second wall overlies at least a portion of each of the second pair of spaced-apart openings, wherein the first wall comprises a pair of spaced apart access openings in adjacent, overlying relationship with the first pair of openings in the base, and wherein the second wall comprises a pair of spaced apart access openings in adjacent, overlying relationship with the second pair of openings in the base, wherein each access opening facilitates insertion of a fastener into a respective opening in the base and rotation of the fastener via a tool.

14. The apparatus of claim 13, wherein the first wall comprises a pair of spaced apart access openings in adjacent, overlying relationship with the first pair of openings in the base, and wherein the second wall comprises a pair of spaced apart access openings in adjacent, overlying relationship with the second pair of openings in the base.

15. The apparatus of claim 14, wherein each access opening is substantially larger than a respective opening in the base.

16. The apparatus of claim 8, wherein the first and second walls extend outwardly from the base first surface in a direction that is substantially orthogonal to the base first surface.

* * * * *